US012333965B2

(12) United States Patent
Swenson et al.

(10) Patent No.: US 12,333,965 B2
(45) Date of Patent: Jun. 17, 2025

(54) CROSS STREET BANNER SUSPENSION SYSTEM

(71) Applicant: Colonial Specialty Co., Inc., Sandy, UT (US)

(72) Inventors: Paul Swenson, Sandy, UT (US); Jeff Wixom, Sandy, UT (US); Bob Chavez, Sandy, UT (US)

(73) Assignee: Colonial Specialty Co., Inc., Sandy, UT (US)

(*) Notice: Subject to any disclaimer, the term of this patent is extended or adjusted under 35 U.S.C. 154(b) by 0 days.

(21) Appl. No.: 18/225,653

(22) Filed: Jul. 24, 2023

(65) Prior Publication Data

US 2024/0119872 A1 Apr. 11, 2024

Related U.S. Application Data

(62) Division of application No. 17/100,792, filed on Nov. 20, 2020, now Pat. No. 12,073,745.

(Continued)

(51) Int. Cl.
*G09F 17/00* (2006.01)

(52) U.S. Cl.
CPC ...... *G09F 17/00* (2013.01); *G09F 2017/0041* (2013.01)

(58) Field of Classification Search
CPC .. G09F 17/00; G09F 2017/0041; G09F 15/00; E06B 9/00; E06B 2009/002;

(Continued)

(56) References Cited

U.S. PATENT DOCUMENTS

| | | | |
|---|---|---|---|
| 2,177,327 A | 10/1939 | Oberlin | |
| 2,252,764 A | 8/1941 | Farrell | |

(Continued)

FOREIGN PATENT DOCUMENTS

| | | | | |
|---|---|---|---|---|
| AT | 405772 B * | 9/1999 | ......... G09F 15/0025 |
| DE | 202004019576 U1 | 2/2005 | |

(Continued)

OTHER PUBLICATIONS

Screen capture from YouTube video clip entitled “Banner over Douglas Street,” 1 pg, uploaded on Nov. 21, 2015 by user “Minimax Media Ltd”. Retrieved from Internet: <https://www.youtube.com/watch?v=HIKTqyY7uqk>. (Year: 2015).*

(Continued)

*Primary Examiner* — Cassandra Davis
(74) *Attorney, Agent, or Firm* — Christopher L. Johnson

(57) ABSTRACT

A banner support system comprising a first support pole supporting a winch, a first support line coupler, a second support line coupler, a first aperture, a first access port, and a second access port. A second support pole comprises a third anchor point, a fourth anchor point, a second aperture, and a third access port. The upper support line is coupled to the first support line coupler and the third support line coupler, and the lower support line is coupled to the second support line coupler and the fourth support line coupler. The banner is slidably coupled to the upper support line and the lower support line. The first tensioning line is coupled to the winch and extends from the first aperture and is coupled to a first end of the banner. The second tensioning line extends from the second aperture to a second end of the banner.

17 Claims, 12 Drawing Sheets

Related U.S. Application Data

(60) Provisional application No. 62/938,310, filed on Nov. 20, 2019.

(58) Field of Classification Search
CPC ... E04H 17/127; E04H 17/133; E04H 17/139; E04H 17/266; E04H 15/58; E04H 15/322; A47G 1/16; D06C 3/08
See application file for complete search history.

(56) References Cited

U.S. PATENT DOCUMENTS

| | | | | | |
|---|---|---|---|---|---|
| 2,507,623 | A * | 5/1950 | Dionicio | E04H 12/32 248/910 |
| 2,911,746 | A | 11/1959 | Frey | |
| 3,537,201 | A | 11/1970 | Huey et al. | |
| 5,319,870 | A | 6/1994 | Weiss | |
| 5,522,165 | A | 6/1996 | Molla | |
| 5,701,840 | A | 12/1997 | Cross | |
| 6,845,589 | B1 * | 1/2005 | Thompson | E01F 13/028 49/34 |
| 7,117,620 | B2 * | 10/2006 | Tolna | G09F 15/0025 40/604 |
| 7,513,073 | B1 | 4/2009 | Smith | |
| 11,873,655 | B2 * | 1/2024 | Brawner | B65H 49/327 |
| 2004/0173724 | A1 | 9/2004 | Tolna | |
| 2009/0146029 | A1 | 6/2009 | Beatty | |
| 2009/0255159 | A1 | 10/2009 | Smith | |
| 2011/0192340 | A1 | 8/2011 | Somers | |
| 2013/0269229 | A1 | 10/2013 | Rodriguez-Aparicio, Sr. | |
| 2013/0319315 | A1 | 12/2013 | Chen | |
| 2014/0075797 | A1 | 3/2014 | Urbina | |
| 2015/0349399 | A1 * | 12/2015 | Lasier | H01Q 1/1242 248/542 |
| 2016/0035257 | A1 | 2/2016 | Likas | |

FOREIGN PATENT DOCUMENTS

| | | | | | |
|---|---|---|---|---|---|
| DE | 102011009273 | A1 * | 7/2012 | E04F 10/0681 |
| EP | 2219170 | A2 * | 8/2010 | G09F 15/0025 |
| KR | 200382057 | * | 4/2005 | |
| KR | 20100006439 | A * | 1/2010 | |
| KR | 475149 | Y1 * | 11/2014 | |

OTHER PUBLICATIONS

Google Maps, Left Post, 2019, 1 page, USPTO retrieved for U.S. Appl. No. 17/100,792 from https://www.google.com/maps/@48.4339983,-123.3646231,3a,75y,205.77h,80.8t/data=!3m7!1e1!3m5!1sPE2RndRhPeyW3EGDR4hlbQ!2e0!5s20191001T000000!7i16384!8i8192?entry=ttu.

Google Maps, Right Post, 2019, 1 page, USPTO retrieved from U.S. Appl. No. 17/100,792 from https://www.google.com/maps/@48.4337872,-123.3646571,3a,75y,205.77h,80.8t/data=!3m7!1e1!3m5!1sPE2RndRhPEyW3EGDR4hlbQ!2e0!5s20191001T000000!7i16384!8i8192?entry=ttu.

* cited by examiner

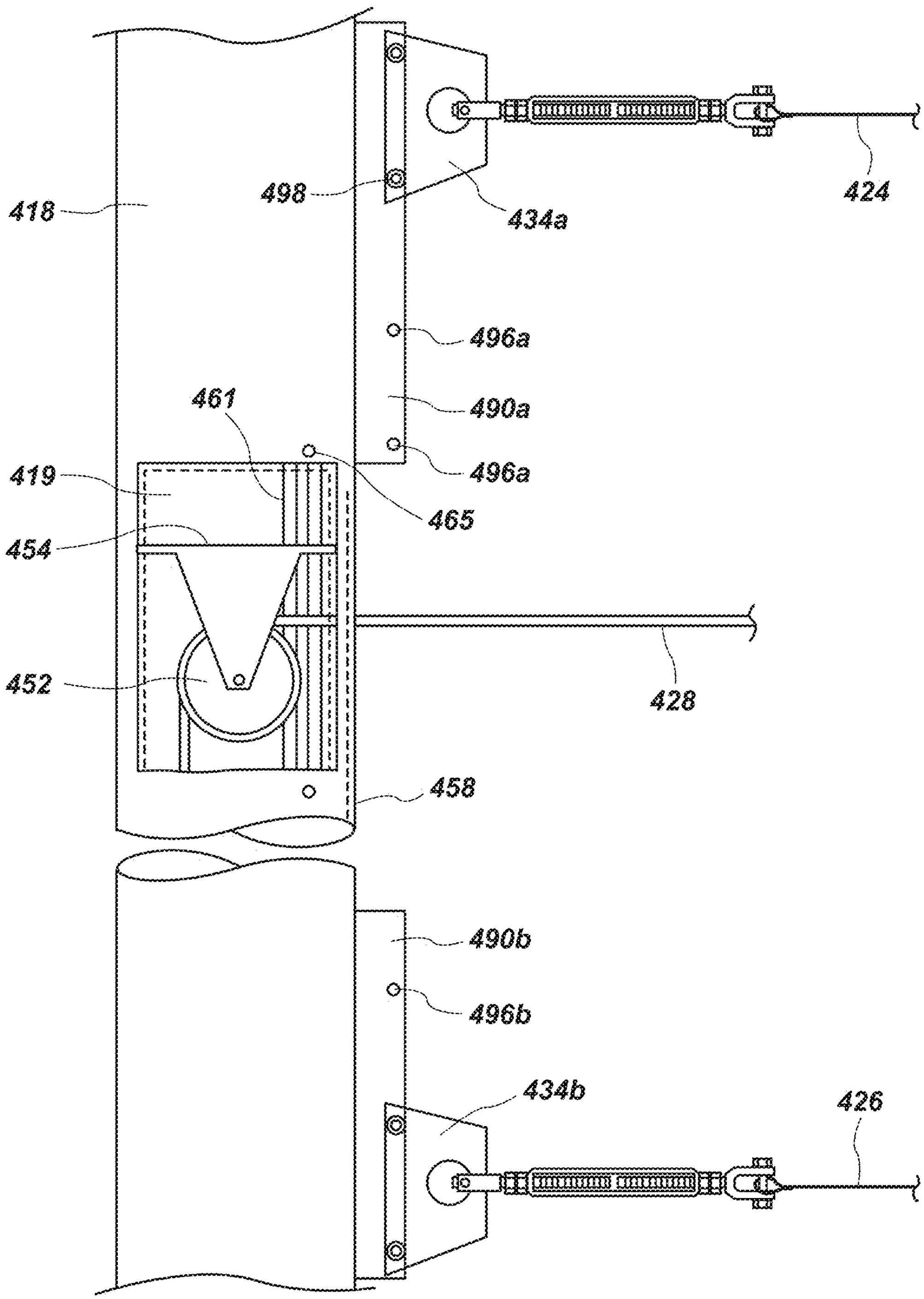
FIG. 11-A

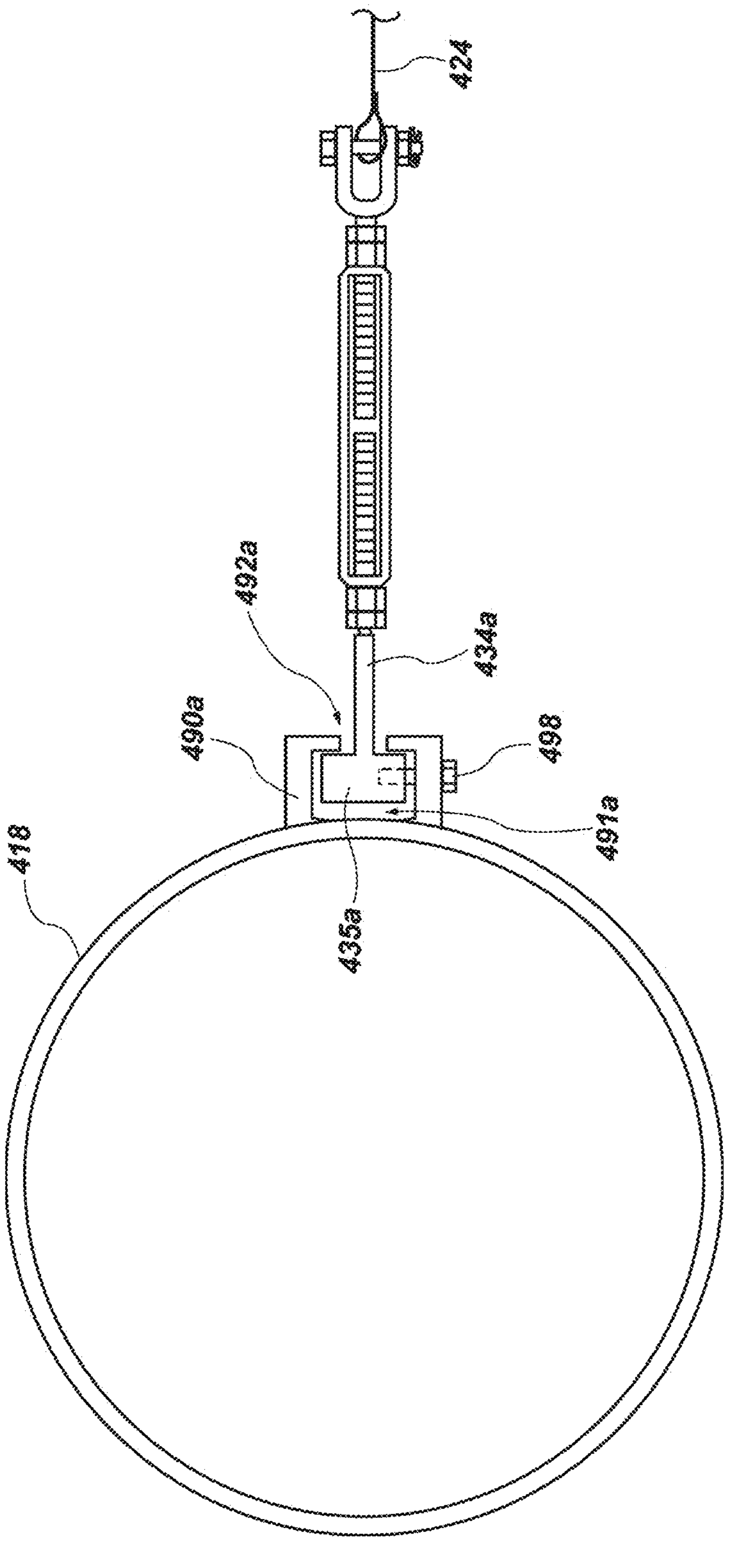
FIG. 11-B

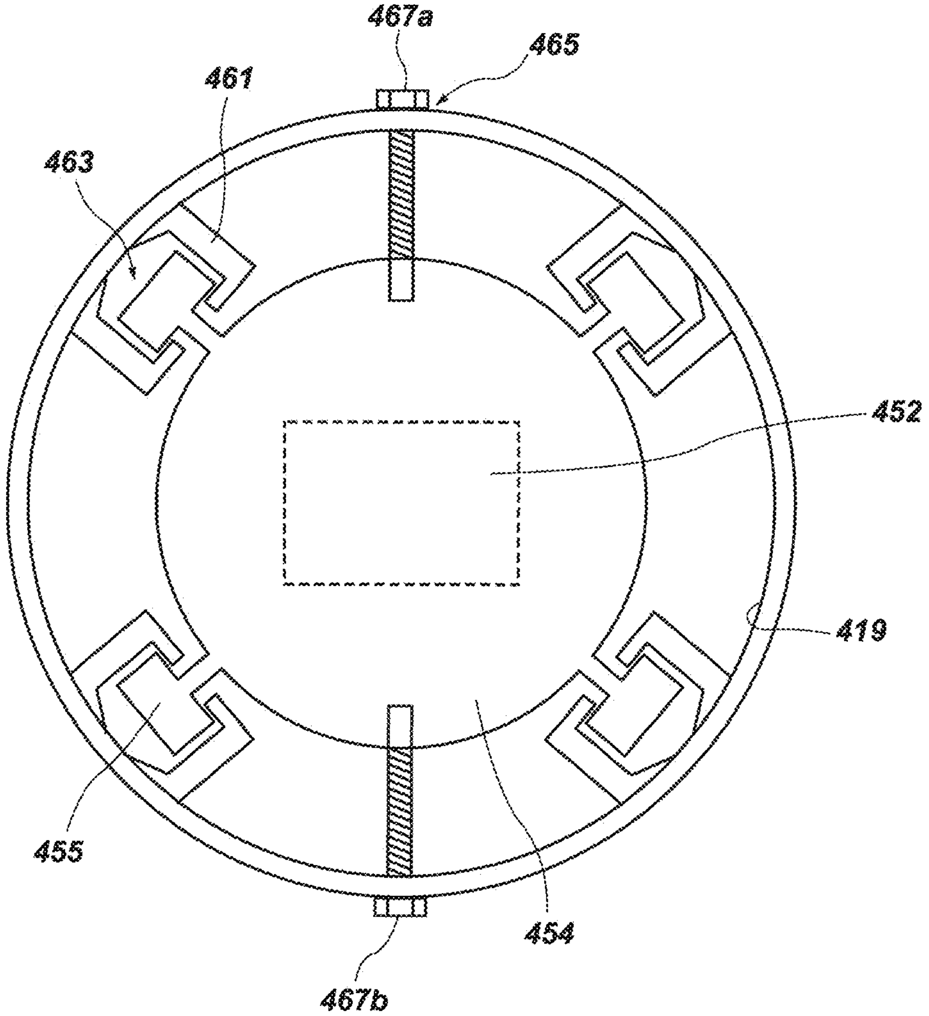
FIG. 11-C

CROSS STREET BANNER SUSPENSION SYSTEM

RELATED APPLICATIONS

This is a divisional application of U.S. application Ser. No. 17/100,792, filed Nov. 20, 2020, entitled "Cross Street Banner Suspension System" which claims the benefit of U.S. Provisional Application Ser. No. 62/938,310, filed Nov. 20, 2019, and entitled, "Cross Street Banner Suspension System", each of which is incorporated by reference in its entirety herein.

BACKGROUND

In many cities, towns, and other communities, it is customary to publicize community events, provide seasonal or other greetings, make announcements and to convey other types of information using publicly displayed banners. One example is a banner that is suspended above a street and that crosses over or that spans the street. Such a banner can be caused to be viewable to those traveling in vehicles about the street, to pedestrians and to anyone else in proximity to the banner for the purpose of conveying the information on the banner. However, suspending a banner across a street can be a tedious, time consuming task. Furthermore, with existing systems, the street that the banner crosses may need to be closed to traffic while the banner is being suspended.

Conventional processes for suspending a banner can include locating suitable mounting structures, such as a light poles, and securing each end of the banner to the structures. Banners that span a street or road must be secured high above the street and conform to governmental height requirements, such as being of sufficient height in order to meet the prescribed clearances for vehicles (including large vehicles, such as large trucks) to travel the street or road unobstructed by the banner. As such, a lift can be required to be deployed at each end of the banner and on both sides of the street during installation to elevate an installer to the necessary height to secure the banner in place about the mounting structures. After the banner is no longer needed, it is typically removed and stored for the next event, again requiring a lift to be deployed at each end of the banner.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 11-A illustrates an example of an adjustable support line coupling system, and an adjustable tensioning line coupling system, in accordance with an example of the present disclosure.

FIG. 11-B illustrates a top view of the adjustable support line coupling system of FIG. 11-A.

FIG. 11-C illustrates a top view of the adjustable tensioning line coupling system of FIG. 11-A.

Figure 1:
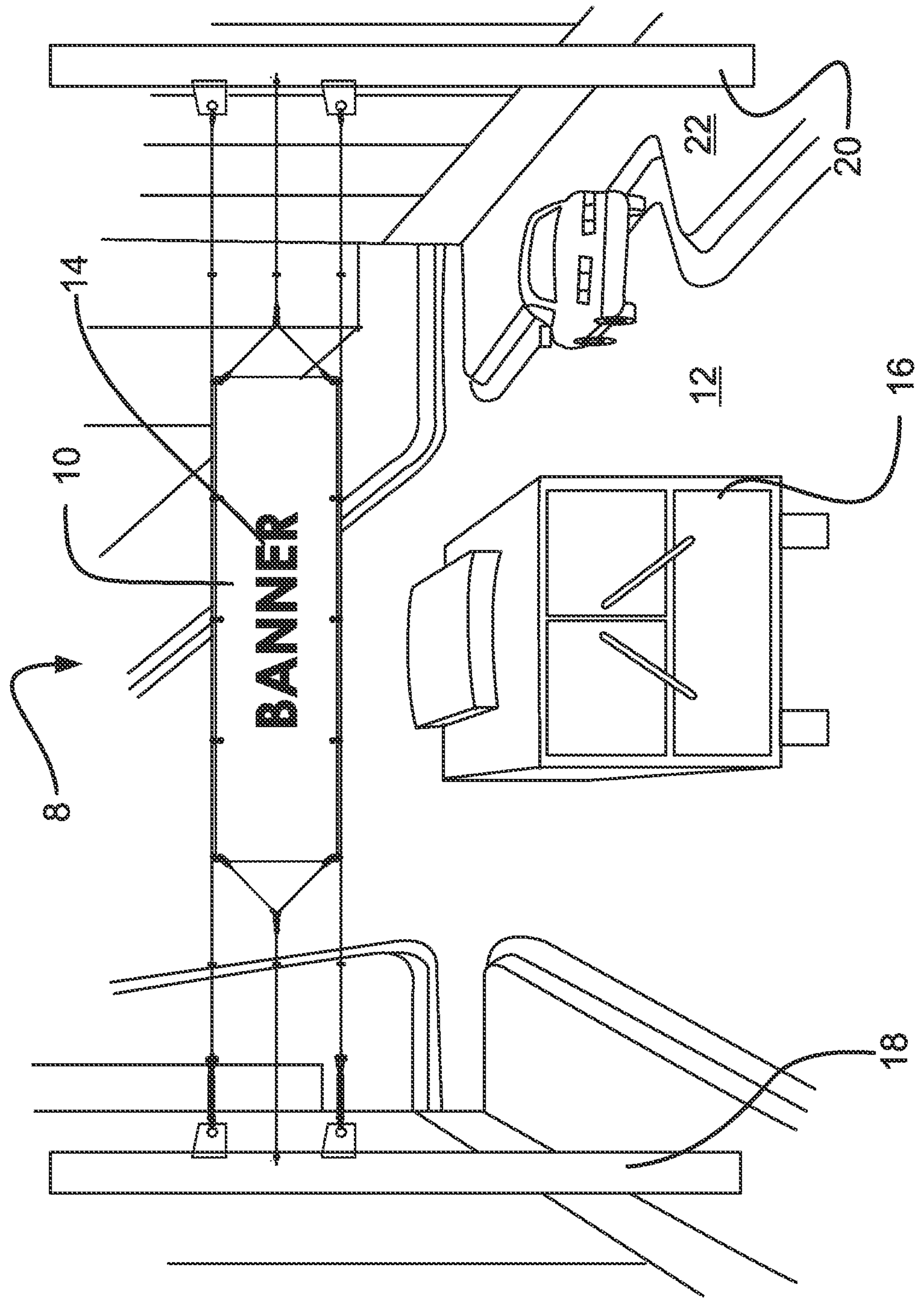
FIG. 1 illustrates an installed banner support system in accordance with an example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "distal" refers to a direction or orientation distant from a point of reference. For example, referring to an extraction system, a base can be used as a point of reference. Thus, a direction away from the base can be considered a distal direction. Similarly, an object or reference that is further away from the base than another object or reference can be considered distal.

An initial overview of the inventive concepts is provided below, and then specific examples are described in further detail later. This initial summary is intended to aid readers in understanding the examples more quickly but is not intended to identify key features or essential features of the examples, nor is it intended to limit the scope of the claimed subject matter.

The present disclosure sets forth a banner support or suspension system, comprising a first support pole, a first winch supported by the first support pole, a first support line coupler supported by the first support pole, and defining a first anchor point, a second support line coupler supported by the first support pole, and defining a second anchor point, a first aperture formed in the first support pole, and located between the first and second support line couplers, a second support pole, a third support line coupler supported by the second support pole, and defining a third anchor point, a fourth support line coupler supported by the second support pole, and defining a fourth anchor point, an aperture formed in the second support pole, and positioned between the third and fourth support line couplers, an upper support line coupled to the first support line coupler and the third support line coupler, a lower support line coupled to the second support line coupler and the fourth support line coupler, a banner slidably coupled to the upper support line and the lower support line, a first tensioning line coupled to the first winch and extending from the first aperture of the first support pole and coupled to a first end of the banner, and a second tensioning line extending from the aperture formed in the second support pole to a second end of the banner opposite the first end.

In one example, the banner support system can further comprise a second winch supported by the second support pole, wherein the second winch is coupled to the second tensioning line.

In one example, the banner support system can further comprise a second winch supported by the first support pole and coupled to the second tensioning line, the banner support system further comprising a second aperture formed in the first support pole, wherein the second tensioning line is coupled to the second winch and extends from the second aperture to the second support pole.

In one example, the first tensioning line and the second tensioning line are each coupled to the respective first and second ends of the banner with a spring connection.

In one example, the banner support system can further comprise a first pulley supported by the first support pole, a second pulley supported by the second support pole, and a third pulley supported by the second support pole, wherein the second tensioning line is supported by and routed around the first, second, and third pulleys from the first support pole to the second support pole.

In one example, the first, second, third, and fourth support line couplers each comprise a tab having an aperture there through for facilitating the releasable coupling of the upper and lower support lines, respectively.

In one example, the banner support system can further comprise an adjustable support line coupling system facilitating the vertical adjustment of the upper and lower support lines relative to the first and second support poles and a ground surface.

In one example, the adjustable support line coupling system comprises the first, second, third and fourth support line couplers, each of these being configured as adjustable support line couplers that facilitate the vertical adjustment of the upper and lower support lines.

In one example, the banner support system of can further comprise an adjustable tensioning line coupling system facilitating the vertical adjustment of the first and second tensioning lines relative to the first and second support poles and a ground surface.

In one example, the adjustable tensioning line coupling system comprises one or more adjustable pulleys.

In one example, the banner support system of can further comprise one or more electrical outlets supported by the first support pole or the second support pole.

In one example, the first support pole further comprises a first access port configured to provide access to the first winch, and a second access port configured to provide access to the first aperture.

The present disclosure also sets forth a banner support pole for use within a banner support system, the banner support pole comprising an elongate body having an internal cavity extending longitudinally; a first support line coupler defining a first anchor point and configured to couple to an upper support line; a second support line coupler defining a second anchor point and configured to couple to a lower support line; an aperture formed in the elongate body between the first support line coupler and the second support line coupler; and a winch disposed and supported within the internal cavity.

In one example, the banner support pole can further comprise a banner tensioning line coupled to the winch, and extending from the winch through the aperture.

In one example, the banner support pole can further comprise a second winch located within the internal cavity, a second aperture formed in the elongate body, and a second banner tensioning line, wherein the second banner tensioning line is coupled to the second winch and extends from the second aperture.

In one example, the banner tensioning line comprises a spring connector.

In one example, the banner support pole can further comprise a first pulley supported by the elongate body at an upper portion of the support pole proximate the aperture.

In one example, the banner support pole can further comprise a second pulley supported by the elongate body at a location proximate the second aperture, wherein the banner tensioning line extends along the first pulley and the second banner tensioning line extends along the second pulley.

In one example, the first and second support line couplers each comprise a tab having an aperture there through.

In one example, the banner support pole can further comprise an adjustable support line coupling system comprising the first and second support line couplers, each of these being configured as adjustable support line couplers, the adjustable support line coupling system facilitating the vertical adjustment of the upper and lower support lines relative to the first and second support poles and a ground surface.

In one example, the banner support pole can further comprise an adjustable tensioning line coupling system facilitating the vertical adjustment of one or more tensioning lines relative to the first and second support poles and a ground surface In one example, the banner support pole can further comprise an electrical outlet. This can be located anywhere along the banner support pole, such as proximate an access port.

The present disclosure still further sets forth a banner support system, comprising a first support pole positioned at a first location (e.g., installed on a first side of a street), the first support pole comprising a support line coupler; a second support pole positioned at a second location offset from the first location (e.g., installed on a second side of the street), the second support pole comprising a support line coupler; a support line coupled to the support line couplers and spanning across the street between the first and second support poles; a banner slidably coupled to the support line; a tensioning line extending from the first support pole and coupled to a first end of the banner; and a second tensioning line extending from the second support pole and coupled to a second end of the banner.

In one example, the first support pole comprises an additional support line coupler, and the second support pole comprises an additional support line coupler, the banner support system further comprising a second support line coupled to the additional support line couplers and spanning across the street between the first and second support poles.

In one example, the banner support system can further comprise a first winch operably coupled to the first tensioning line, and a second winch operably coupled to the second tensioning line.

In one example, the first and second winches are both supported by the first support pole.

In one example, the banner support system can further comprise an adjustable support line coupling system facilitating the vertical adjustment of the support line relative to the first and second support poles.

In one example, the banner support system can further comprise an adjustable tensioning line coupling system facilitating the vertical adjustment of the first and second tensioning lines relative to the first and second support poles and a ground surface.

To further describe the present technology, examples are now provided with reference to the figures. FIG. 1 illustrates an example of a banner support system 8, which can also be referred to as a banner suspension system, supporting and displaying a banner 10 above a ground surface, such as across a road or street 12. The banner 10 can comprise various indicia or information to be conveyed to individuals, such as a message (e.g., see message 14), an announcement, a greeting or any other type of information or indicia. The banner 10 can be elevated above the street 12 to enable pedestrians, individuals in vehicles, such as bus 16, and others to view the banner 10, and in the case of vehicles, to travel about the street 12 without contacting or being obstructed by the banner 10 or any of the components of the banner support system 8. It is noted that the banner support system 8 can support other objects other than a banner, and as such, a banner is not intended to be limiting in any way. Indeed, those skilled in the art will recognize that other objects could be supported by the banner support system using the various support and tensioning lines. For example, other object could include, but are not limited to, decorations, lights or lighting components, and others, and any combination of these or other objects.

The banner 10 can be supported by first and second banner support poles 18, 20 mounted to or otherwise supported about the ground on both sides of the street 12 and that extend upward from the ground a distance sufficient to support the banner 10 at an intended height above the ground. The first and second support poles 18, 20 can be located in a sidewalk 22 adjacent the street 12, or in another designated area, such as a park strip adjacent the street 12. In some examples, the support poles 18, 20 can be attached or mounted to a permanently installed mounting plate in the sidewalk 22 or other adjacent ground surface. In other examples, the support poles 18, 20 may extend through the sidewalk 22 or other surface and into the ground, and supported in place using any type of in-ground mounting or installation system. These examples are not intended to be limiting in any way. Indeed, various means and methods can be used for supporting the banner support poles about the ground surface, each of which are contemplated herein.

Figure 2:
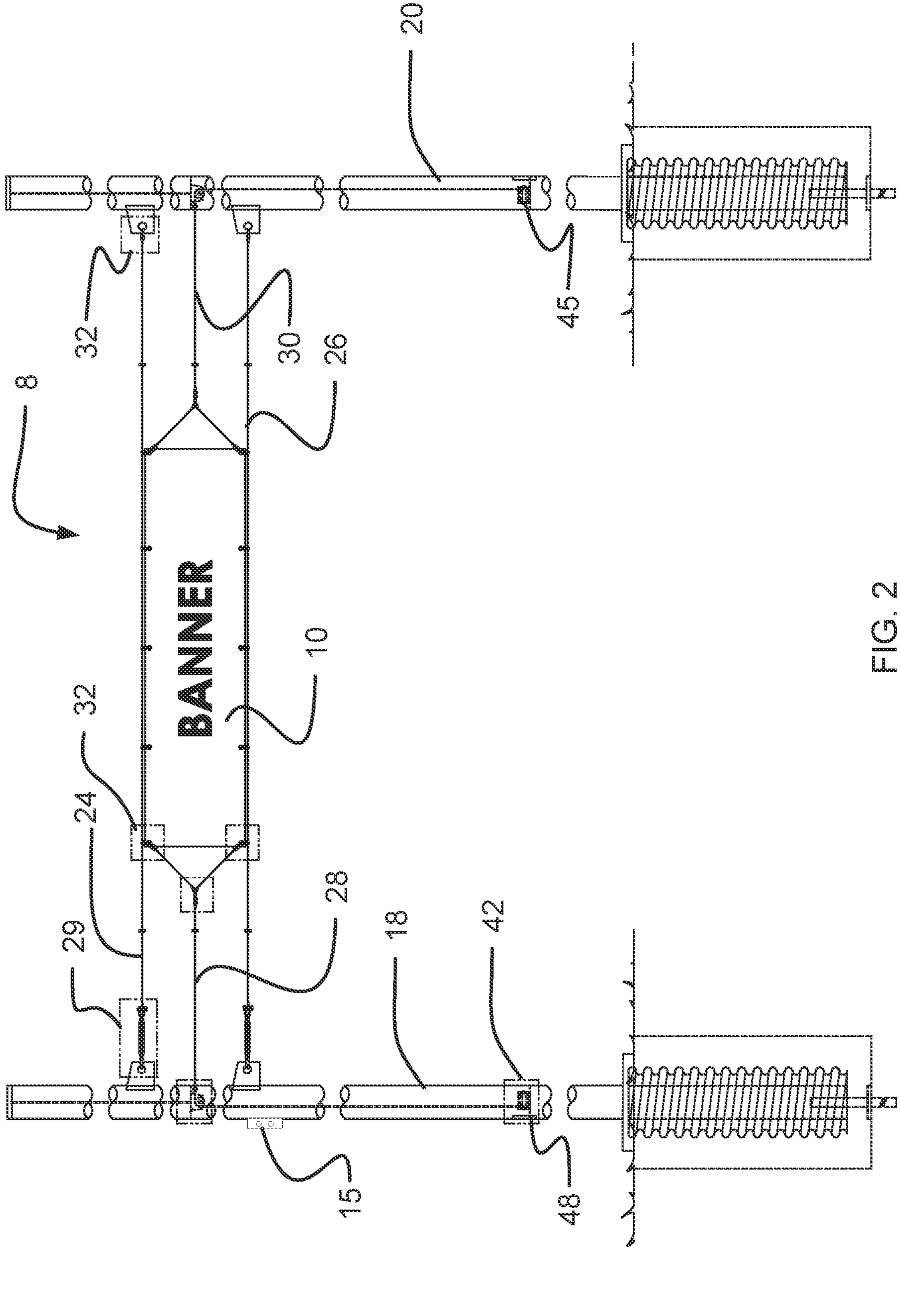
FIG. 2 illustrates a front schematic of the banner support system of FIG. 1.

FIG. 2 illustrates a schematic of the banner support system 8 shown in FIG. 1. The banner support system 8 comprises a banner 10 (but this could be another type of object or objects to be displayed instead of a banner, such as lights, decorations, etc.), a first support pole 18, a second support pole 20 positioned a distance away from the first support pole 18, an upper or first support line 24, a lower or second support line 26, a first tensioning line 28, and a second tensioning line 30. The first and second support poles 18, 20 can each comprise an elongate body having a hollow internal cavity extending longitudinally along an axis. In other words, the first and second support poles 18, 20 can comprise a thin-wall configuration having any cross-sectional shape, such as circular, oval, square, rectangular, and others.

The upper or first support line 24, the lower or second support line 26, the first and second tensioning lines 28, 30 can comprise a rope, a chain, a cable, or any other type of line sufficient to support a displayed banner. As will be described in further detail below, the first and second (upper and lower) support lines 24, 26 are each coupled to the first support pole 18 and the second support pole 20 at an offset distance. The upper and lower support lines 24, 26 are offset vertically (relative to the ground surface) from one another leaving a space between the two support lines 24, 26. The banner 10 can be located in the space between the first and lower support lines 24, 26. The top of the banner 10 can be slidably coupled to the upper support line 24 and the bottom of the banner 10 can be slidably coupled to the lower support line 26, such that the banner 10 can slide along the upper and lower support lines. The first tensioning line 28 extends from the first support pole 18 and is coupled to a first end of the banner 10. The second tensioning line 30 extends from the second support pole 20 and is coupled to a second end of the banner 10. The first and second tensioning lines 28, 30 provide a tension (i.e., apply a tensioning force) to the banner 10 pulling or tensioning the banner 10 at each end. One or both of the first and second tensioning lines 28, 30 can be movable to apply the tensioning force.

In some examples, the banner support system 8 can further comprise one or more power or electrical outlets, such as power outlet 15 supported by the first support pole 18. In the example shown, a conduit can be secured to the first support pole 18, and can run inside or outside the first support pole 18 to connect the power outlet 15 to a ground level power source. The power outlet(s) can be used to supply power to the banner 10, or to one or more components supported by the banner support system 8, such as lights or lighting components operable to illuminate the banner 10.

Figure 3:
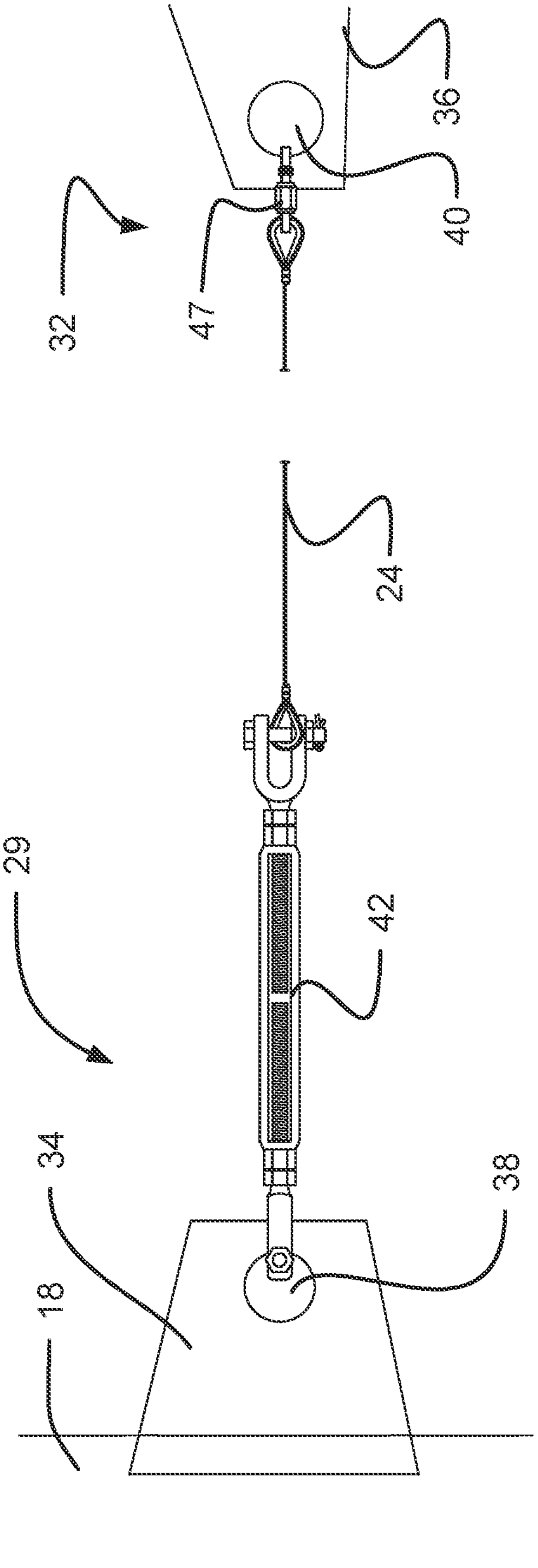
FIG. 3 illustrates a detailed view of a banner support line coupled to a support pole of the banner support system of FIGS. 1 and 2.

FIG. 3 illustrates a detailed view of a first support line coupler defining a first anchor point 29 and a third support line coupler defining a third anchor point 32 of the upper support line 24 in accordance with some examples. The upper and lower support lines 24, 26 can each be connected to the first and second banner support poles 18, 20 in the same manner shown in FIG. 3, and as such, only the coupling or connecting of the upper support line 24 is described here. The first support line coupler can comprise a first tab 34 coupled to the first support pole 18. For example, the first tab 34 can be welded, bolted or otherwise secured to the first support pole 18. Similarly, a third tab 36 can be coupled to the second support pole 20 (not shown). The third tab 36 can be welded to the second support pole 20. Each of the first and third tabs 34, 36 can include an aperture (e.g., see aperture 38 formed in the first tab 34, and aperture 40 formed in the third tab 36), which can be used to secure the upper support line 24, such that the upper support line 24 extends between the first and second support line couplers and the first and second support poles 18, 20.

The first support line coupler can further comprise a tensioning connector, such as a turnbuckle 42. The tensioning connector can be coupled to the first tab 34 via the aperture 38 of the first tab 34 at one end, and to the upper support line 24 at an opposing end. In the example of FIG. 3, the coupling of the tensioning connector to the first tab 34 is provided by a first bolt extending through the aperture 38 and a second bolt (via an anchor shackle) extending through a thimble of the upper support line 24. However, this is not intended to be limiting in any way as the tensioning connector can be coupled to the first tab 34 and to the upper support line 24 in a variety of different ways and using a variety of different attachment or coupling devices, systems.

In one example, the third support line coupler can also comprise a tensioning connector, such as one that is similar to the tensioning connector of the first support line coupler. In another example, the third support line coupler can comprise a fixed connection, such as a quick connect or quick link 47. The fixed connection can be coupled to the third tab 36 via the aperture 40 of the third tab 36 at one end and to the upper support line 24 at an opposing end. In the example of FIG. 3, the quick connect 47, also termed a quick link, couples to the tab 36 and a thimble of the upper support line 24 by looping through the aperture 40 of the third tab 36 and the thimble, and then securing the quick connect 47 using the thumb screw to close the opening of the quick connect 47. Other connection types for the first and third support line couplers are possible, such as a spring snap or carabiner.

When the upper support line 24 is coupled at one end to the first support line coupler, such as via a tensioning connector, and to the third support line coupler, such as to a fixed connection at an opposing end, the tensioning connector can be used to adjust or vary the tension in the upper support line 24. For example, in FIG. 3, the turnbuckle 42 can be rotated causing the ends of the turnbuckle 42 to move towards one another, taking up any slack in the upper support line 24, and increasing the tension in the upper support line 24. As indicated above, a tensioning connector, such as a turnbuckle, can be used to couple to both ends of the upper support line 24, and each turnbuckle can be used to adjust the tension in the upper support line 24. Once the support lines 24, 26 are installed, they can be left in place when a banner is not being displayed.

Figure 4:
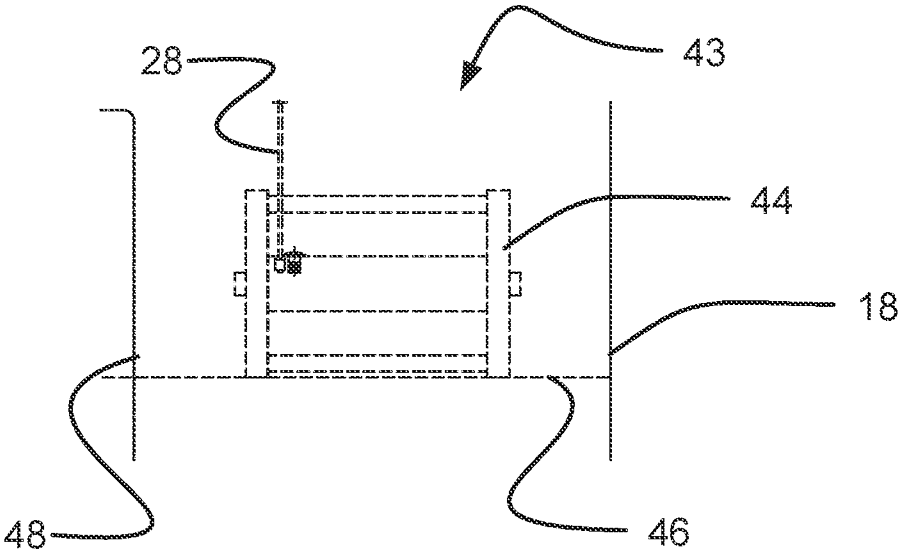
FIG. 4 illustrates a detailed view of a winch located within one of the banner support poles of the banner support system of FIGS. 1 and 2.

FIG. 4 illustrates a detailed view of a winching assembly 43 located within the first support pole 18. A similar winching assembly may be located within the second support pole 20. The winching assembly located within the second support pole 20 can be substantially similar to the winching assembly 43 of the first support pole. The winching assembly 43 can comprise a winch 44 located within and supported by the first support pole 18, such as at a position accessible by a user from the ground. In one example, a mounting plate 46 can be secured within an interior of the first support pole 18 and the winch 44 can be secured to the mounting plate 46. In this example, the mounting plate 46 is shown being mounted horizontally, but this is not to be limiting in any way. An access port, such as door 48, can be provided that facilities access to the winch 44, as well as providing a cover to the interior of the first support pole 18. In one example, the access port can comprise a lock to prevent unauthorized access to the winching assembly 43. The winch 44 can be coupled to a first end of the first tensioning line 28, and the second end of the tensioning line 28 can be coupled to the banner 10, either directly or indirectly. Actuating the winch 44 operates to wind the first tensioning line 28 around a drum of the winch 44, pulling or drawing the first tensioning line 28 into the first support pole 18. In some examples, the winch 44 can be hand operated as shown in FIG. 5. In other examples, the winch 44 can comprise a powered winch, and can be powered, such as by an electric motor.

Figure 5C:
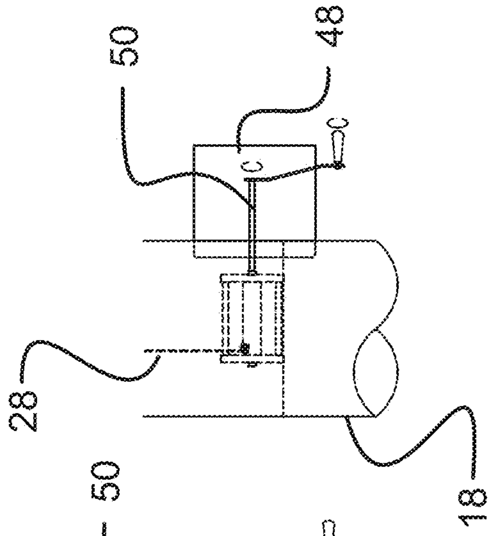
FIG. 5*c* illustrates a detailed view of the winch of FIG. 4 in a third stage of operation.
Figure 5B:
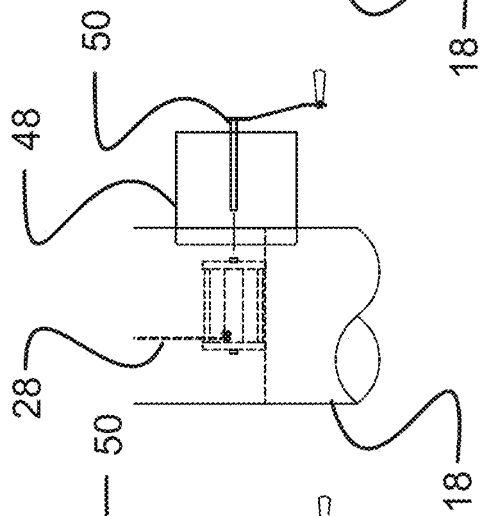
FIG. 5*b* illustrates a detailed view of the winch of FIG. 4 in a second stage of operation.
Figure 5A:
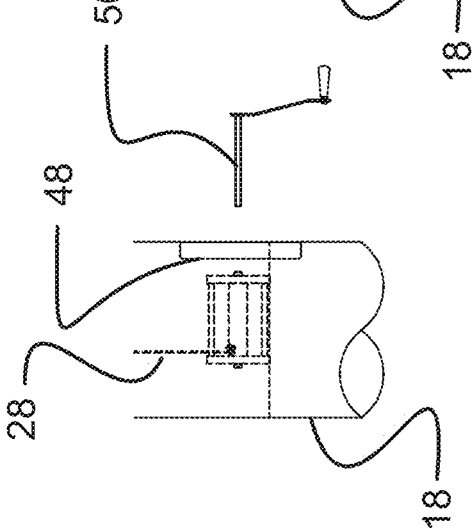
FIG. 5*a* illustrates a detailed view of the winch of FIG. 4 in a first stage of operation.

FIGS. 5*a* through 5*c* illustrate a process of winding the winch 44 using a hand crank 50 configured to interface with and be received within an input (e.g., a socket) of the drum of the winch 44, such that the hand crank 50 releasably couples to the drum of the winch 44 where it can be manipulated (cranked) to manipulate a rotational position of the winch 44. FIG. 5*a* illustrates the winch 44 in its normal state or in a first stage, such as when a banner 10 is not being readied for display. In FIG. 5*a*, the door 48 is closed preventing access to the winch 44. As shown in FIG. 5*b*, the door 48 can be opened to allow access to the winch 44 by a user, such as a user using the hand crank 50. In this stage, the hand crank 50 can be inserted though the doorway and coupled to the drum of the winch 44. In a third stage, as shown in FIG. 5*c*, the hand crank 50 can then be rotated to rotate the drum of the winch 44 and wind the first tensioning line 28 onto the drum of the winch 44, which effectively functions to draw in the tensioning line 28 (and to apply a tension force to a banner or other object coupled to the tensioning line 28, as discussed below).

Figure 6:
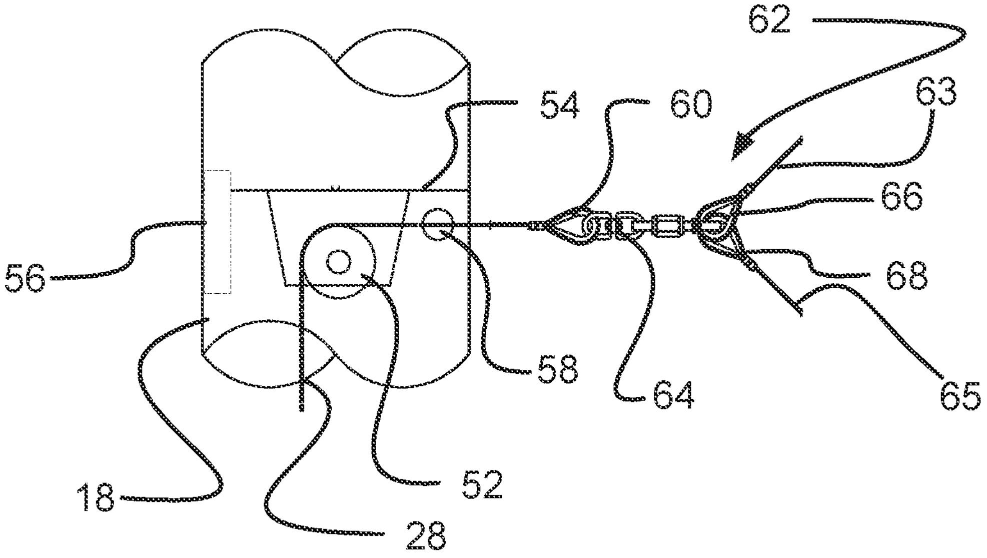
FIG. 6 illustrates a detailed view of a banner tension line exiting a support pole of the banner support system of FIGS. 1 and 2.

FIGS. 1, 2 and 6 illustrate a second end of the first tensioning line 28 exiting the first support pole 18 and coupling to the banner 10. A pulley 52 can be located within the first support pole 18 to change a direction of the first tensioning line 28 from vertical to horizontal as the first tensioning line 28 extends from the first support pole 18. The pulley 52 can be mounted to a support plate 54 secured within the first support pole 18, or it can be mounted in any other way as will be recognized by those skilled in the art. An access port, such as door 56, provides access to the pulley 52 from outside the first support pole 18. The first tensioning line 28 can be configured to exit the first support pole 18 through an aperture 58 formed in the first support pole 18.

A thimble 60 of the first tensioning line 28 can be coupled to the banner 10 (see FIG. 2) either directly, or via a connection assembly 62. In one non-limiting example, the connection assembly 62 can be coupled to the banner 10 and provides an interface and assembly for connecting the first tensioning line 28 to the banner 10. In one example, the connection assembly 62 can comprise first and second lateral lines 63, 65 (which can comprise ropes, cables, chains or any other type) extending between the tensioning line 28 and various corners of a first end of the banner 10 (see FIGS. 2, 6 and 7). In this example, one or more connectors, such as quick connectors 64 (e.g., quick links, swivels, carabiners, and others, and any combination of these), couples the thimble 60 of the first tensioning line 28 to thimbles 66, 68 on proximate ends of the first and second lateral lines 63, 65 of the connection assembly 62. Thus, the first tensioning line 28 is coupled to the connection assembly 62, which is in turn coupled to the banner 10. As the winch 44 is wound, the tensioning line 28 pulls on the connection assembly 62 and the banner 10, drawing the banner 10 towards the first support pole 18. This same type of setup can be used to couple the second end of the banner to the second support pole 20 via its tensioning line.

Figure 7:
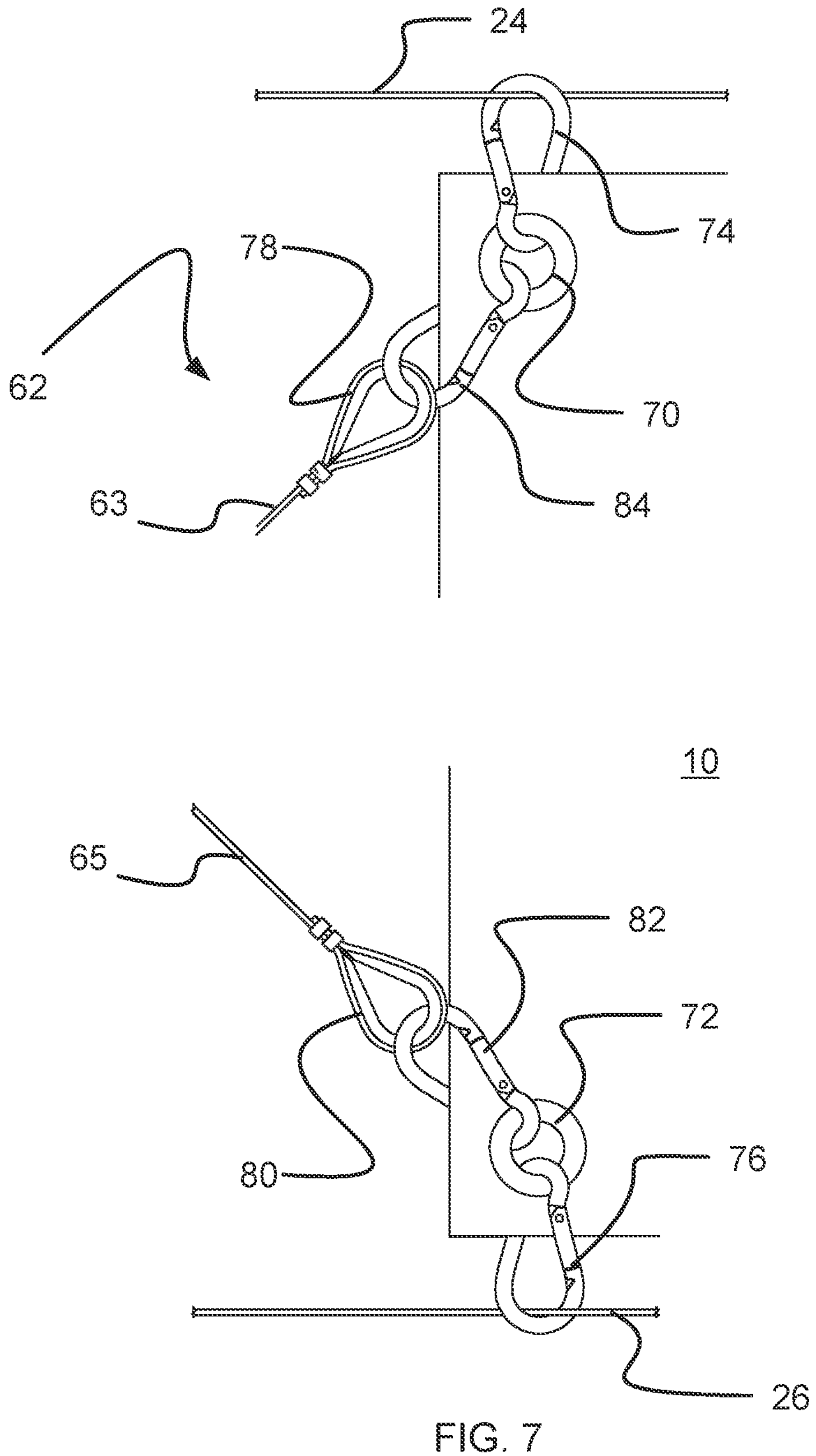
FIG. 7 illustrates a detailed view of a banner coupled to support lines and a tensioning line of the banner support system of FIGS. 1 and 2.
Figure 8:
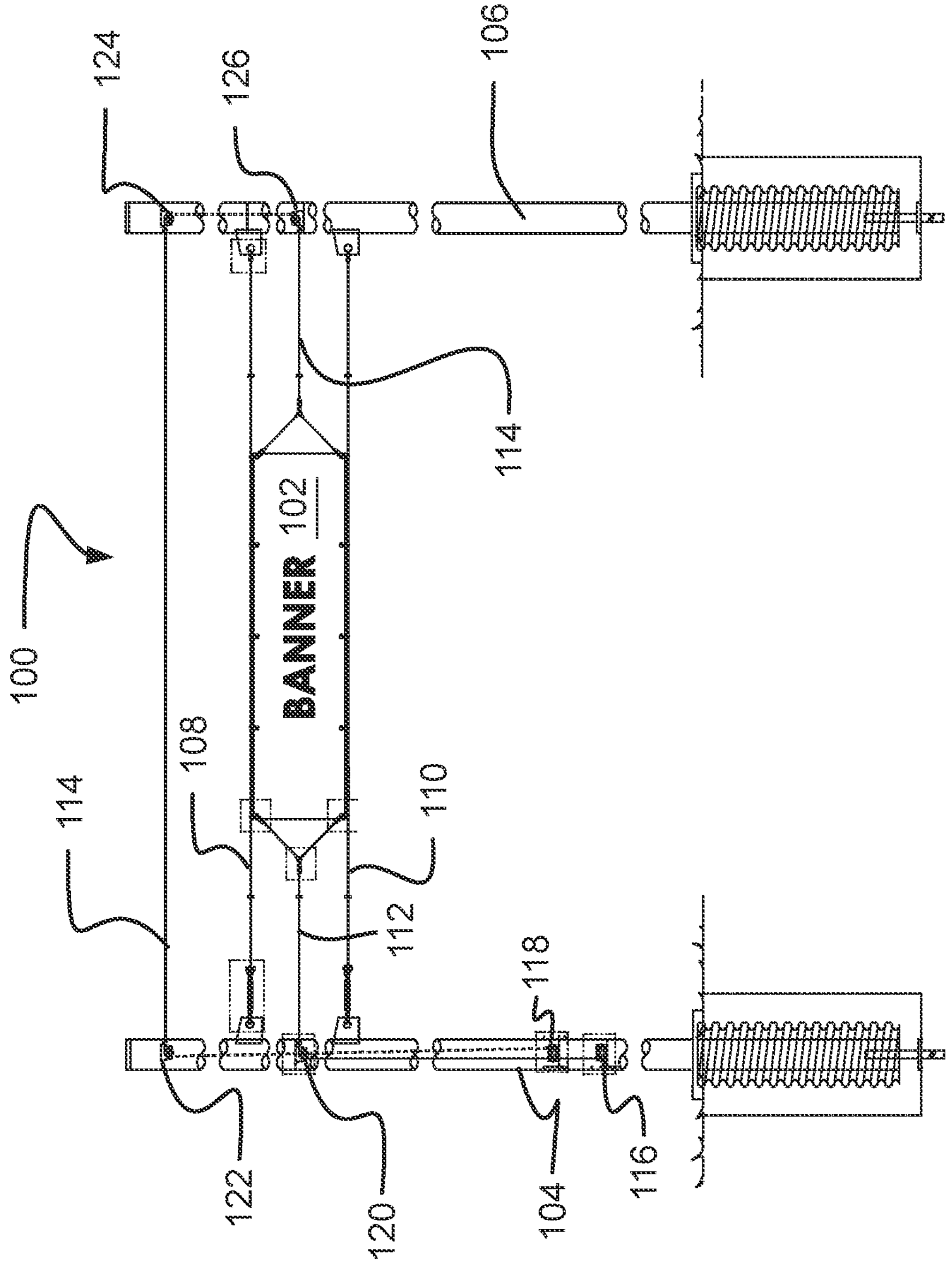
FIG. 8 illustrates a front schematic of a banner support system in accordance with an example of the present disclosure.

FIG. 7 illustrates the connection of the upper and lower support lines 24, 26 and the connection assembly 62 (shown partially in FIG. 7) to the first end of the banner 10. The banner 10 can comprise reinforced grommet holes 70, 72 for facilitating the attachment of the banner 10 to the upper and lower support lines 24, 26, respectively, and to the connection assembly 62. The upper support line 24 and the lower support line 26 are tensioned between the first and second support poles 18, 20, as discussed herein. The upper support line 24 and the lower support line 26 can be spaced vertically by any distance suitable to support and display the banner 10. In one example, the distance can be at least that of a height of the banner 10 to be displayed. The banner 10 can be slidably coupled to the upper support line 24 via the upper grommet hole 70 using a connector, such as a spring snap connector 74, coupled to both the upper grommet hole 70 and the upper support line 24. Likewise, the banner 10 can be slidably coupled to the lower support line 26 via the lower grommet hole 72 using a connector, such as a spring snap connector 76, coupled to both the lower grommet hole 72 and the lower support line 26. The spring snap connectors 74, 76 can have enclosed loops that pass through the respective grommet holes 70, 72 in the banner 10, and around a respective one of the upper and lower support lines 24, 26. Similar grommets are found at an opposing second end of the banner 10, and the banner 10 can be slidably coupled to the first and second support lines 24, 26 at the opposing second end using the same technique. Additionally, depending on the length of the banner 10, additional or intermediate grommet holes can be provided in the banner 10 between the end grommet holes 70, 72, and additional connectors can be used to connect to the upper and lower support lines 24, 26 to support various intermediate portions of the banner 10 about the upper and lower support lines 24, 26 (see FIGS. 2 and 8 showing intermediate slidable connections). In the example of FIG. 2, the banner 10 comprises five upper grommet holes and five lower grommet holes that are used in conjunction with respective connectors to support the banner 10 about the upper and lower support lines 24, 26. The intermediate grommet holes can be used to facilitate the slidable coupling of the banner 10 to the upper and lower support lines 24, 26 in the same manner as the grommet holes at the first and second ends of the banner 10.

The connection assembly 62 used to secure the tensioning line 28 to the banner 10 can be coupled to the upper and lower end grommet holes 70, 72 of the first end of the banner 10 using a similar technique. For example, the upper thimble 78 and the first lateral line 63 of the connection assembly 62 can be coupled to the upper grommet hole 70 of the banner 10 using a spring snap connector 84, and the lower thimble 80 and the second lateral line 65 of the connection assembly 62 can be coupled to the lower grommet hole 72 using a spring snap connector 82. As those skilled in the art will recognize, the connection of the second end of the banner 10 to the second tensioning line 30 can be carried out in the same or a substantially similar manner to the connection of the first end of the banner 10 to the first tensioning line 28, and as such will not be discussed in detail.

The operation of the banner support system 8 and the installation of a banner 10 will now be described with references to FIGS. 2 through 7. Installation of the banner 10 can be performed with the banner 10 being coupled first to the second support pole 20 and extending across the street 12 to the first support pole 18. However, one of ordinary skill in the art will recognize that the process may be reversed to install the banner 10 first from the first support pole 18 to the second support pole 20.

Initially, the banner 10 is positioned with the first end of the banner 10 proximate the second support pole 20 between the upper support line 24 and the lower support line 26. A spring snap connector 74 is inserted into the upper grommet hole 70 and fastened to the upper support line 24. Another spring snap connector 76 is inserted into the lower grommet hole 72 and fastened to the lower support line 26, thereby slidably coupling the banner 10 to the upper and lower support lines 24, 26. The first tensioning line 28 can be let out a sufficient amount so that it's length reaches the second support pole 20 so that an installer or operator at the second support pole 20 can couple the thimble 60 supported about the first end of the first tensioning line 28 to the banner 10 while being in a position at the second support pole 20. The first tensioning line 28 can be coupled to the first end of the banner 10 using the connection assembly 62. Specifically, the quick connector 64, which in this example can comprise a swivel type of connector, is connected to the thimble 60 of the first tensioning line 28. The thimble 78 about the second end of the first lateral line 63 of the connection assembly 62 is connected to the upper grommet hole 70 by a spring snap connector 84, with the thimble 66 about the first end of the first lateral line 63 being connected to the quick connector 64, such as via a quick link or quick connect. Similarly, the thimble 80 about the second end of the second lateral line 65 of the connection assembly 62 is connected to the lower grommet hole 72 by spring snap connector 82, with the thimble 68 about the first end of the second lateral line 65 being connected to the quick connector 64 via the same quick link or quick connect coupling the first lateral line 63 to the quick connector 64.

With the first tensioning line 28 connected to the first end of the banner 10 by the connection assembly 62, and with the first end of the banner 10 slidably coupled to the upper and lower support lines 24, 26, the first winch 44 in the first support pole 18 and coupled to the first tensioning line 28 can be actuated. As the winch 44 winds the first tensioning line 28, it pulls the end of the banner 10 along the upper and lower support lines 24, 26 away from the second support pole 20 towards the first support pole 18. As intermediate grommets in the banner 10 are brought into position, intermediate portions of the banner 10 can be slidably coupled to the upper support line 24 and the lower support line 26 using additional spring clip connectors. Thus, as the banner 10 is pulled along the upper and lower support lines 24, 26, additional intermediate connections are made between the banner 10 and the upper and lower support lines 24, 26 to secure the top and the bottom edges of the banner 10 to these lines. In some examples, the banner 10 may be connected at each grommet hole prior to first tensioning line 28 pulling the banner 10 away from the second support pole 20.

The second tensioning line 30 can be coupled to the opposing or second end of the banner 10 using the same technique described with respect to the first end of the banner 10 (e.g., with a similar connection assembly as connection assembly 62). As the first tensioning line 28 pulls the banner 10 away from the second support pole 20, thus extending the banner 10, a winch 45 located within the second support pole 20 can unwind and let out the second tensioning line 30. In some examples, the operator or installer may manually unwind the winch 45 in the second support pole 20, or in other examples, the winch 45 may be set to "free spool," wherein the winch 45 passively unspools the second tensioning line 30 as the first winch 44 in the first support pole 18 is actuated.

When the banner 10 is in the desired location, the first and second winches 44, 45 can be actuated to tension the banner 10 by retracting or winding one or both of the first and second tensioning lines 28, 30. For example, the first and second winches 44, 45 can each be wound to tension the banner 10, and to properly position the banner relative to the first and second support poles 18, 20. Or, in another example, one of the winches, such as the second winch 45 in the second support pole 20, may be locked once the second end of the banner 10 is in a proper position relative to the second support pole 20 so that it does not "free spool," wherein the other winch, in this example the first winch 44, can be actuated to wind and draw in the first tensioning line 28 until the first and second tensioning lines 28, 30 and the banner 10 are properly tensioned and positioned.

It will be apparent to those skilled in the art that the process may be reversed to uninstall and remove the banner 10. One of the winches, such as winch 44, can be set to "free spool" or can be manually unwound. The other winch, such as winch 45, can then be wound to pull the banner 10 towards the second support pole 20. Once the connection assembly about the second end of the banner 10 reaches the support pole 20, the connection assembly can be decoupled from the second end of the banner 10. The banner 10 can then be manually pulled along the support lines 24, 26 until the connection assembly 62 about the first end of the banner 10 reaches the second support pole 20, wherein the spring clip connectors securing the grommet holes 70, 72 to the support lines 24, 26 and the first tensioning line 28 can be removed. After all of the spring clip connectors are removed, the banner 10 may be removed. The two connection assemblies 62 can be removed from the first and second tension lines 28, 30 as well. In some examples, the first tensioning line 28 and the second tensioning line 30 can be coupled to one another for storage until another banner is installed.

FIG. 8 illustrates another example of a banner support system 100. The banner support system 100 of FIG. 8 is similar to the banner support system 8 illustrated in FIGS. 1 through 7, thus like elements will not be described in detail except as described below. The banner support system 100 comprises a banner 102, a first support pole 104, a second support pole 106, an upper support line 108, a lower support line 110, a first tensioning line 112, and a second tensioning line 114.

The upper and lower support lines 108, 110 are each coupled to the first and second support poles 104, 106 as described previously, however in this example, the first and second support poles 104, 106 can comprise pole portions that extend above the upper and lower support lines 108, 110 a sufficient distance. One of the first or second support poles 104, 106 can comprise two winches. In the example shown, the first support pole 104 comprises a first winch 116 and a second winch 118. Alternatively, the second support pole 106 can comprise the first and second winches 116, 118. In this specific example, the second support pole 106 does not require a winch. As described previously, winches 116, 118 can each have an access door or opening through the support pole providing access to the respective winches 116, 118. The first winch 116 can be coupled to the first tensioning line 112 and the second winch 118 can be coupled to the second tensioning line 114. The first tensioning line 112 can be configured substantially similar to the previously described first tensioning line 28 of FIGS. 1-7, with a first pulley 120 changing the vertical direction of the first tensioning line 112 to horizontal and exiting the first support pole 104 through an aperture formed therein.

The second tensioning line 114 can be configured to extend (i.e., be routed) within the first support pole 104 vertically above the aperture for the first support line 108. A second pulley 122 can be supported by the first support pole 104 and positioned so as to change the direction of the second tensioning line 114 to a horizontal direction, with the second tensioning line 114 exiting the first support pole 104 through a second aperture of the first support pole 104. Unlike the example banner support system 8 of FIGS. 1-7, the second tensioning line 114 of the banner support system 100 can be configured to extend or be routed from the first support pole 104 to the second support pole 106. The second tensioning line 114 can be caused to enter the second support pole 106 through an aperture above the aperture for the first support line 108, wherein a third pulley 124 supported by the second support pole 106 operates to change the direction of the second tensioning line 114 to a vertical direction. The second tensioning line 114 can be configured to extend around the third pulley 124 and to be routed downward within the second support pole 106 until it reaches a fourth pulley 126 that changes the direction of the second tensioning line 114 to horizontal. The second tensioning line 114 can be configured to exit the second support pole 106 through a fourth aperture positioned between the apertures for the upper and lower support lines 108, 110, wherein the second tensioning line 114 can be extended or routed the distance across the street to the first support pole 104 and coupled to the second end of the banner 10 from the same side of the street and the first support pole 104 as the first tensioning line 112 is coupled to the first end of the banner 10. To maintain the second tensioning line 114 at the first support pole 104 until a banner is coupled thereto (e.g., to maintain the second tensioning line 114 in a stowed position), the second tensioning line 114 can be coupled to the first support pole 104, such as via a hook on the first support pole 104 and a snap fit connector that couples the second tensioning line 114 to the first support pole 104.

Operation of the example banner support system 100 of FIG. 8 is similar to the previously described examples. However, with the example banner support system 100 of FIG. 8, the banner 102 can be installed from a single side of the street since both winches 116, 118 are located on the same side, since both the first and second tensioning lines 112, 114 are routed initially from the same side (e.g., from the first support pole 104), and since the banner 102 can be secured to both the first and second tensioning lines 112, 114 from the same side of the street, in this example from the first support pole 106. Thus, a single operator may wind and unwind either winch 116, 118 to install and uninstall the banner 102 from the location of the first support pole 104 without having to cross the street. Of course, those skilled in the art will recognize that the operator can install and uninstall the banner in a similar manner from the second support pole 104 if equipped with the two winches and the requisite pulley assemblies. Alternatively, each of the first and second support poles 104, 106 can comprise two winches so installation and uninstall can take place from either side of the street.

Figure 9:
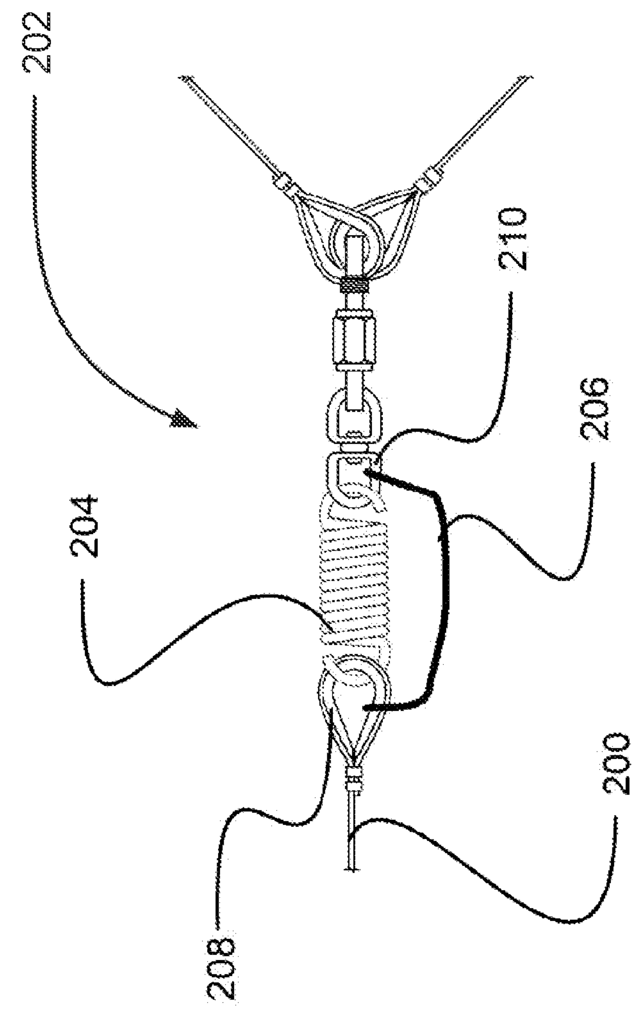
FIG. 9 illustrates an example of a tension line coupled to a banner connection assembly for use in any of the banner support systems of FIGS. 1, 2 and 8.

FIG. 9 illustrates an example tensioning line 200 coupled to an example connection assembly 202. The connection assembly 202 is similar to the previously described connection assembly with reference to FIGS. 2-7. However, the connection assembly 202 of FIG. 9 further comprises a spring 204 and a safety line 206. The spring 204 can be coupled to a thimble 208 of the tension line 200 and a quick connector 210 of the connection assembly 202. The safety line 206 can also be connected to the thimble 208 and the quick connector 210. The spring 204 allows a banner coupled to the connection assembly 202 to move a limited amount as constrained by the spring 204 after being installed. For example, if the banner is subjected to wind, the loading on the banner may cause the spring 204 to flex and extend within its inherent range of motion. This can help to dissipate some of the dynamic loads that may be acting on the banner and on the tensioning line 200 due to the wind. If the spring 204 becomes overloaded or otherwise fails, the safety line 206 can be actuated to secure the tension line 200 to the connection assembly 202. Thus, if the spring 204 fails, the tension line 200 will not drop from the banner and the banner will remain suspended between the first and second support poles. Various types and sizes of springs can be used.

The banner support systems described herein can further comprise adjustable support lines, as well as adjustable tensioning lines. The adjustable support lines and the adjustable tensioning lines can be supported and can operate in a similar manner as discussed above. However, unlike those discussed above, which are fixed, the banner support systems described herein can further comprise an adjustable support line coupling system (operable with one support pole or both support poles) to facilitate the adjustability of either or both of the upper and lower support lines and of either end or both of the ends of either or both of the upper and lower support lines, as well an adjustable tensioning line coupling system (operable with one support pole or both support poles) to facilitate the adjustability of either end or both ends of the tensioning line.

Figure 10:
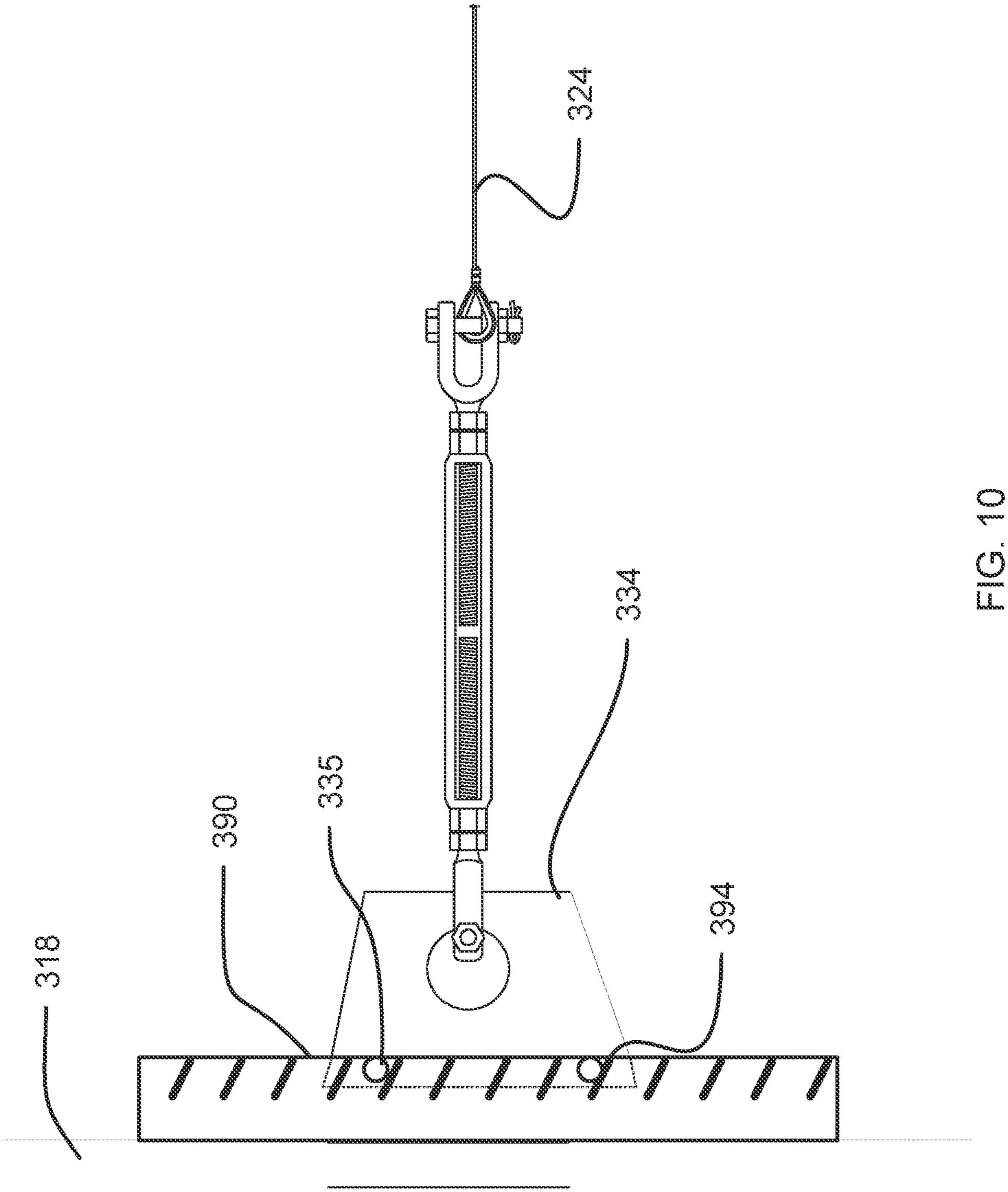
FIG. 10 illustrates an example of a height adjustable support line coupler for use in any of the banner support systems of FIGS. 1, 2 and 8.

FIG. 10 illustrates an example of an adjustable support line coupling system comprising an adjustable support line coupler supported about a support pole, and operable to secure one end of a support line to a support pole within a banner support system. In one example, as shown, the adjustable support line coupler can comprise an anchor 390, such as in the form of a metal box-like structure, mounted to the exterior of a support pole 318, and can comprise an anchor point for a first end of a support line 324. In this example, the adjustable support line coupler further comprises a tab 334 that is slidably or adjustably mounted to the support pole 318 via the anchor 390, thus allowing the tab 334 to be vertically moveable or adjustable bi-directionally relative to the anchor 390 and the support pole 318. As discussed above, a banner support system can comprise two support poles, one on each side of a street or road, as well as upper and lower support lines. As such, and although not shown, it is contemplated that the adjustable support line coupling system can comprise two (e.g., first and second) adjustable support line couplers (one on each support pole) operable to couple first and second ends of the support line 324, which can comprise an upper support line, spanning between each of the support poles of the banner support system, wherein each of the adjustable support line couplers can facilitate the adjustability of a respective end of the support line 324 coupled thereto. The adjustable support line coupling system can further comprise two additional (e.g., third and fourth) adjustable support line couplers (one on each support pole) operable to couple first and second ends of a lower support line (not shown, but see lower support line 28 of FIG. 2, and lower support line 110 of FIG. 8) spanning between each of the support poles of the banner support system, wherein each of the adjustable support line couplers can facilitate the adjustability of a respective end of the lower support line coupled thereto. The second, third and fourth adjustable support line couplers can be configured the same as, and can function the same as, the first support line coupler shown and discussed herein.

In the example shown, the support line 324 can be repositioned or adjusted up or down by moving the tab 334 of the adjustable support line coupler up or down relative to the support pole 318. As indicated, this same functionality can be provided by each of the adjustable support line couplers in the banner support system. Providing an adjustable support line coupler system has significant advantages. For example, and not intended to be limiting in any way, some advantages include the ability for the banner support system to accommodate different banner heights relative to the road or street, with the adjustable support line couplers for the upper and lower support lines being used in conjunction with adjustable tensioning lines as described herein to facilitate the height adjustment of the banner relative to the street or road. Indeed, there may be times when the height of a particular banner relative to the street or road may need to be adjusted, such as to accommodate changing regulations or laws, or when a particular banner is desired to be positioned at a height different from a previous or other banners. Another advantage is that the banner support system can accommodate different banner sizes and configurations (e.g., banners having different widths or heights (such as banners 24 inches wide or banners 30 inches wide), banners having non-uniform configurations, such as those having varying widths along their length, those having tapering edges, those having curved edges, and others). Indeed, in some cases, the various adjustable support line couplers in the banner support system can be adjusted and positioned so that the upper and lower support lines are not parallel to one another. Whether the tension lines are adjustable or not, the tabs 334 can be adjusted relative to one another. For example, if the anchor points need to be adjusted to accommodate a banner that is six inches taller (wider) than a current or different banner configuration, then the upper tab on a first support pole can be moved up three inches and the lower tab on the first support pole can be moved down three inches to keep the tension line centered. This same configuration and technique can be employed on the second support pole.

In the example of FIG. 10, the tab 334 is operable to move in set increments via a vertical slot formed in the outer wall or face of the anchor 390, and a plurality of upwardly inclined legs 394 (inclined relative to the vertical wall of the support pole) vertically spaced apart from one another and supported by the anchor 390 on each side of the vertical slot that are configured to interface and engage with pins 335 supported on the tab 334. Indeed, the tab 334 can extend through the slot in the anchor 390 with a portion of the tab 334 extending outward and a portion remaining inside the anchor 390. The tab 334 can further comprise upper and lower pins 335 supported about the portion of the tab 334 inside the anchor 390. Each leg 394 can be spaced apart a set distance, such as one inch, two inches, and so forth. For example, if the legs 394 are spaced 2 inches apart, the tab 334 can be adjusted up or down to accommodate varying banner heights in four-inch increments (the tab 334 being adjusted up one leg and a lower tab (not shown) being adjusted down one leg). The tab 334 can be adjusted by manipulating the tab 334 upwards and backwards towards the support pole 318 and relative to the current pair of support legs 394 supporting the tab 334 until the pins 335 clear the current pair of legs 394. The tab 334 may then be moved to a different vertical position. Once in the new position, the tab 334 can be moved forward and downward to cause the pins 335 to engage a different set or pair of legs 394. The weight of the tab 334 and the tension of the support line 324 can help to secure the tab 334 in place, along with the inclined configuration of the legs 394. It is noted herein that the legs 394 can be supported on an interior or inner surface of the support pol 318, with a corresponding vertical slot formed in the support pole 318. In this example, the anchor would be eliminated as the legs 394 would be supported directly by the support pole 318. In an alternative example, the anchor 390 can be configured to be supported on an interior of the support pole 318, with the support pole 318 comprising a vertical slot that aligns with the slot in the anchor 390 to accommodate and facilitate movement of the tab 334.

FIGS. 11-A and 11-B illustrates an example adjustable support line coupling system comprising an adjustable support line coupler supported about a support pole, and operable to secure one end of a support line to a support pole within a banner support system in accordance with another example. In this example, a first adjustable support line coupler and a second adjustable support line coupler are shown, each supported on the same support pole to facilitate adjustment of upper and lower support lines. For simplicity, only the first adjustable support line coupler will be discussed in detail. The adjustable support line coupler can comprise an anchor 490*a*, such as in the form of a metal box-like structure, mounted to the exterior of a support pole 418, and can comprise an anchor point for a first end of an upper support line 424. In this example, the adjustable support line coupler further comprises a tab 434*a* that is slidably or adjustably mounted to the support pole 418 via the anchor 490*a*, thus allowing the tab 434 to be vertically moveable or adjustable bi-directionally relative to the anchor 490*a* and the support pole 418. As discussed above, a banner support system can comprise two support poles, one on each side of a street or road, as well as upper and lower support lines. As such, and although not shown, it is contemplated that the adjustable support line coupling system can comprise two (e.g., first and second) adjustable support line couplers (one on each support pole) operable to couple first and second ends of the upper support line 424 spanning between each of the support poles of the banner support system, wherein each of the adjustable support line couplers can facilitate the adjustability of a respective end of the upper support line 424 coupled thereto. The adjustable support line coupling system can further comprise two additional (e.g., third and fourth) adjustable support line couplers (one on each support pole) operable to couple first and second ends of a lower support line 426 spanning between each of the support poles of the banner support system, wherein each of the third and fourth adjustable support line couplers can facilitate the adjustability of a respective end of the lower support line 426 coupled thereto. The second, third and fourth adjustable support line couplers can be configured the same as, and can function the same as, the first support line coupler shown and discussed herein.

In the example shown, the upper support line 424 can be repositioned or adjusted up or down by moving the tab 434*a* of the adjustable support line coupler up or down within a channel 491*a* formed in the anchor 490*a*, and relative to the support pole 418 and the anchor 490*a*. As indicated, this same functionality can be provided by each of the adjustable support line couplers in the banner support system. The tab 434*a* is operable to move in set increments via a vertical slot 492*a* formed in the outer wall or face of the anchor 490*a*, the channel 491*a*, and a plurality of apertures 496*a* vertically spaced apart from one another and formed in the anchor 490*a*. The apertures 496*a* can extend through the anchor 490*a*, and can be sized to receive a fastener 498 therein. The tab 434*a* can extend through the slot 492*a* in the anchor 490 with a portion of the tab 434*a* extending outward and a flanged portion 435*a* remaining inside the anchor 490*a*. The tab 434*a* can further comprise the flanged portion 435*a*, which can be sized and configured to be wider than the slot 492*a*, thus retaining the tab 434*a* in the anchor 490*a*. Each aperture 496*a* can be spaced apart a set distance, such as one inch, two inches, and so forth. For example, if the apertures 496*a* are spaced 2 inches apart, the tab 434*a* can be adjusted up or down to accommodate varying banner heights in four-inch increments (the tab 434*a* being adjusted up one aperture and a lower tab (see tab 434*b*) being adjusted down one aperture). The tab 434*a* can be adjusted by sliding the tab 434*a* upwards and downwards within the anchor 490*a*, and securing the tab 434*a* in place by inserting a fastener 498 through the aperture 496*a* in the anchor 490*a*, and also through an aperture formed in the flanged portion 435*a* of the tab 434*a* (see FIG. 11-B) once the apertures are aligned with one another. It is noted herein that the anchor 490*a* can be configured to be supported on an interior of the support pole 418, with the support pole 418 comprising a vertical slot that aligns with the slot 492*a* in the anchor 490*a* to accommodate and facilitate movement of the tab 434*a*.

Although not described in detail, the adjustable support line coupling system in shown as comprising a third adjustable support line coupler supported about the support pole 418 for facilitating the adjustability of one end of a lower support line 426. The third adjustable support line coupler can comprise the same or similar components as the first adjustable support line coupler discussed above, such as an anchor 490*b* having apertures 496*b*, a tab 434*b*, and all of the other described components.

As indicated above, the banner support systems described herein can further comprise an adjustable tensioning line coupling system. With reference to FIGS. 11-A and 11-C, the adjustable tensioning line coupling system can comprise an adjustable pulley 452, wherein the pulley 452 can be configured in a similar manner and can function in a similar manner as discussed above, except that it is adjustable vertically within the support pole 418. Indeed, the pulley 452 over which the tensioning line 428 is routed can be adjustable, such that it may be moved up or down to different vertical locations or positions to adjust the height of the tensioning line 428, and to accommodate different banner sizes and/or heights relative to the ground surface. In such examples, rather than an aperture in the support pole 418 from which the tensioning line 428 extends, the support pole 418 can comprise a vertical slot 458 to complement the vertical range of locations or positions of the pulley 452. In some examples, adjustable tensioning line coupling system can comprise a mounting or support plate 454 in support of the pulley 452. As shown, the mounting plate 454 can further comprise one or more tabs 455 that extend radially outward from a perimeter of a mounting surface of the mounting plate 454. Furthermore, the adjustable tensioning line coupling system can comprise one or more rails 461 defining respective channels 463, wherein the one or more rails 461 are mounted vertically to the support pole 418, and more specifically to an inner wall 419 of the support pole 418. The channel(s) of the respective rails 461 can be sized and configured to receive the tabs 455 of the mounting plate 454, and to facilitate the slidable adjustment of the mounting plate 454 relative to the rails 461 and the support pole 418. Indeed, the tabs 455 and the rails 461 can be configured to slidably interface with one another, such that the tabs 455 slidingly engage the rails 461 to provide or facilitate movement of the mounting plate 454 up and down relative to the support pole 418, which also functions to facilitate the vertical adjustment of the pulley 452 mounted thereto, and as a result the vertical adjustment of the tensioning line 428 routed around and supported by the pulley 452, all relative to the support pole 418. As the mounting plate 454 and the pulley 452 are adjusted, the tensioning line 428 also adjusts, facilitated by the slot 458 formed in the support pole 418. The support pole 418 can further comprise a series of apertures 465 vertically spaced apart from one another in discrete distances. The apertures 465 can be sized and configured to receive a fastener or pin therein. As the mounting plate 454 and the pulley 452 are adjusted bi-directionally vertically, the mounting plate 454 can be positioned proximate one of the apertures 465. One or more pins (e.g., see pins 467*a* and 467*b*) can be inserted through a respective one of the apertures 465 and caused to engage the mounting plate 454 to secure the mounting plate in an established vertical position, and to prevent the mounting plate 454 from further vertical movement relative to the support pole 418. As shown, mounting plate 454 can rest on the pins 467*a* and 467*b*. In another example, the pins 467*a* and 467*b* can engage the mounting plate 454, wherein the pins 467*a* and 467*b* function similar to set screws. In still another example, the pins 467*a* and 467*b* can extend into apertures formed in the mounting plate 454. To adjust the vertical position of the pulley, the pins 467*a* and 467*b* can be removed, the mounting plate 454 moved to a different vertical position, and the pins 467*a* and 467*b* inserted into a different set of respective apertures at the new vertical position, with the mounting plate 454 again slidably coupled to the support pole 418 via the pins in the new vertical position.

In another example, although not shown, a mounting plate can be fixed in place and the pulley can be adjusted relative to the mounting plate. In one aspect, the mounting plate can comprise an aperture and an arm can extend through the aperture and couple to and support the pulley. The arm can be movably coupled to the mounting plate and held in place at various vertical positions by a pin or a locking collar. To adjust the vertical location of the pulley, the arm can be slid up or down in the aperture and adjusted relative to the mounting plate, and subsequently locked into a new vertical position or location using the pin or locking collar.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A banner support pole for use within a banner support system, the banner support pole comprising:
- an elongate body having an internal cavity extending longitudinally;
- a first support line coupler defining a first anchor point and configured to couple to an upper support line;
- a first adjustable tensioning connector coupled to the first support line coupler;
- a second support line coupler defining a second anchor point and configured to couple to a lower support line;
- an aperture formed in the elongate body between the first support line coupler and the second support line coupler; and
- a winch disposed and supported within the internal cavity.

2. The banner support pole of claim 1, further comprising a banner tensioning line coupled to the winch, and extending from the winch through the aperture.

3. The banner support pole of claim 2, wherein the banner tensioning line comprises a spring connector.

4. The banner support pole of claim 1, further comprising a second winch located within the internal cavity, a second aperture formed in the elongate body, and a second banner tensioning line, wherein the second banner tensioning line is coupled to the second winch and extends from the second aperture.

5. The banner support pole of claim 4, further comprising a second pulley supported by the elongate body at a location proximate the second aperture, wherein a banner tensioning line extends along the first pulley and the second banner tensioning line extends along the second pulley.

6. The banner support pole of claim 1, further comprising a first pulley supported by the elongate body at an upper portion of the support pole proximate the aperture.

7. The banner support pole of claim 1, wherein the first and second support line couplers each comprise a tab having an aperture there through.

8. A banner support system, comprising:
- the banner support pole of claim 2, wherein the banner support pole comprises a first banner support pole;
- a first winch supported by the first banner support pole;
- a second banner support pole;
- a third support line coupler supported by the second banner support pole, and defining a third anchor point;
- a fourth support line coupler supported by the second banner support pole, and defining a fourth anchor point;
- an aperture formed in the second banner support pole, and positioned between the third and fourth support line couplers;
- the upper support line being coupled to the first support line coupler via the first adjustable tensioning connector, and to the third support line coupler;
- the lower support line being coupled to the second support line coupler and the fourth support line coupler;
- a banner slidably coupled to the upper support line and the lower support line;
- a first tensioning line coupled to the first winch and extending from the first aperture of the first banner support pole and coupled to a first end of the banner; and
- a second tensioning line extending from the aperture formed in the second banner support pole to a second end of the banner opposite the first end of the banner.

9. A banner support system, comprising:
- the banner support pole of claim 1, wherein the banner support pole comprises a first banner support pole, the first banner support pole being positioned at a first location;
- a second banner support pole positioned at a second location offset from the first location, the second banner support pole further comprising at least one support line coupler and an adjustable tensioning connector;
- a support line coupled to the support line couplers of the first and second banner support poles via the respective adjustable tensioning connectors of the first and second banner support poles, and spanning across the street between the first and second banner support poles;
- a banner slidably coupled to the support line;

a tensioning line extending from the first banner support pole and coupled to a first end of the banner; and a second tensioning line extending from the second banner support pole and coupled to a second end of the banner.

10. A method for making a banner support pole for use within a banner support system, the method comprising:

configuring an elongate body to have an internal cavity extending longitudinally;

configuring a first support line coupler to be supported by the elongate body, the first support line coupler defining a first anchor point and being configured to couple to an upper support line;

facilitating the first support line coupler to be coupled to a first adjustable tensioning connector;

configuring a second support line coupler to be supported by the elongate body, the second support line coupler defining a second anchor point and being configured to couple to a lower support line;

configuring the elongate body to comprise an aperture between the first support line coupler and the second support line coupler; and facilitating support of a winch within the internal cavity of the elongate body.

11. The method of claim 10, further comprising configuring the banner support pole to be operable within the banner support system.

12. The method of claim 10, further comprising facilitating coupling of a banner tensioning line to the winch, and extension of the banner tensioning line from the winch through the aperture.

13. The method of claim 12, further comprising:

facilitating the support of a second winch within the internal cavity of the elongate body;

configuring the elongate body to comprise a second aperture; and facilitating the coupling of a second banner tensioning line to the second winch, and the extension of the second banner tensioning line from the second winch through the second aperture.

14. The method of claim 12, wherein the banner tensioning line comprises a spring connector.

15. The method of claim 10, further comprising configuring a first pulley to be supported by the elongate body at an upper portion proximate the aperture.

16. The method of claim 15, further comprising configuring a second pulley to be supported by the elongate body at a location proximate a second aperture, wherein a first banner tensioning line extends along the first pulley and a second banner tensioning line extends along the second pulley.

17. The method of claim 10, wherein the first and second support line couplers each comprise a tab having an aperture there through.

* * * * *